(12) United States Patent
Malmberg

(10) Patent No.: US 8,454,026 B2
(45) Date of Patent: Jun. 4, 2013

(54) DUST SEALING

(75) Inventor: Mats Malmberg, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 761 days.

(21) Appl. No.: 12/155,424

(22) Filed: Jun. 4, 2008

(65) Prior Publication Data

US 2008/0309026 A1 Dec. 18, 2008

(30) Foreign Application Priority Data

Jun. 15, 2007 (SE) ........................................ 0701480

(51) Int. Cl.
*F16C 11/0671* (2006.01)

(52) U.S. Cl.
USPC .......................................... 277/635; 277/644

(58) Field of Classification Search
USPC .............................. 277/635, 644; 49/339, 401
See application file for complete search history.

(56) References Cited

U.S. PATENT DOCUMENTS

| D260,557 S | * | 9/1981 | Bowman | D25/121 |
| 5,667,224 A | * | 9/1997 | Streckert et al. | 277/634 |
| 2002/0113375 A1 | * | 8/2002 | Ruderman | 277/389 |

FOREIGN PATENT DOCUMENTS

| DE | 71 40 670 | 4/1972 |
| DE | 39 09 444 | 9/1990 |
| GB | 1 520 220 | 8/1978 |
| GB | 2 141 188 | 12/1984 |
| JP | 61175374 A | * 8/1986 |

* cited by examiner

*Primary Examiner* — Vishal Patel
*Assistant Examiner* — Eugene G Byrd
(74) *Attorney, Agent, or Firm* — Morgan, Lewis & Bockius LLP

(57) ABSTRACT

The present invention concerns a system for sealing between a rock processing equipment, such as a vibrating screen and a stationary cover or other part. A sealing strip is arranged between the vibrating screen and the stationary cover. The sealing strip is attached to snap profiles fixed to the vibrating screen and the stationary cover, respectively. The sealing strip is fixed to the snap profiles by means of grip strips. The sealing strip is placed slanted in relation to the sides of the vibrating screen and stationary cover, respectively.

10 Claims, 3 Drawing Sheets

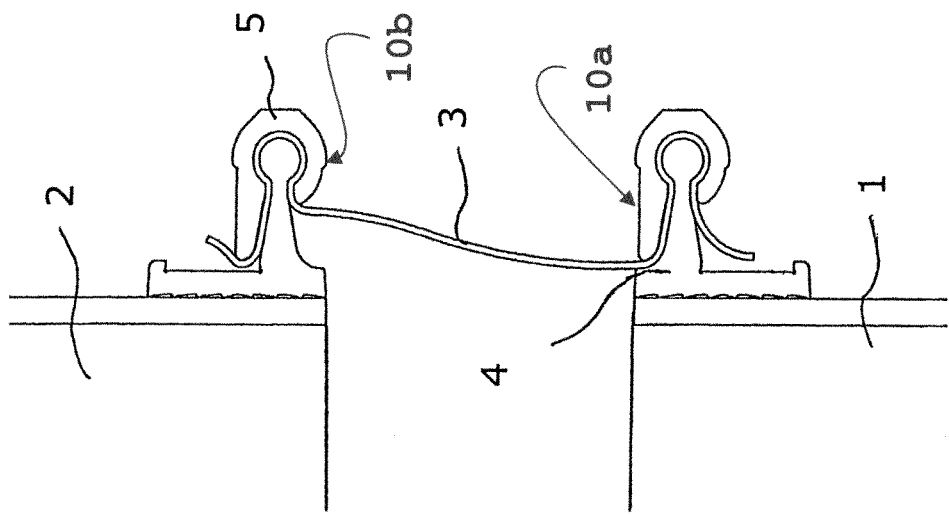
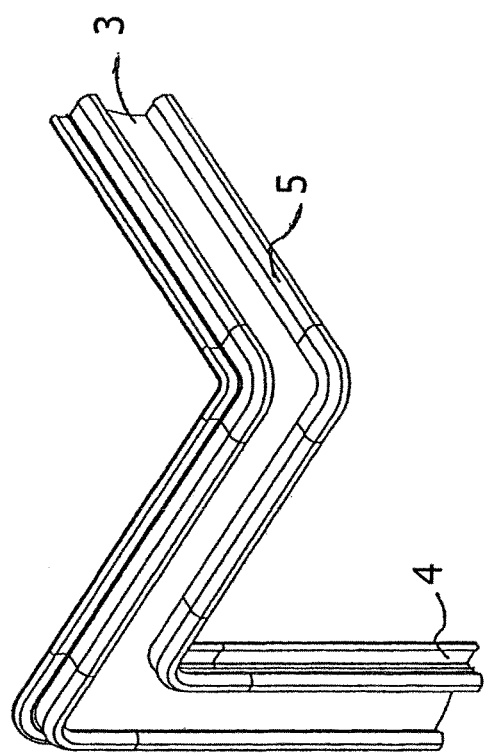

DUST SEALING

CROSS-REFERENCE TO PRIOR APPLICATION

This application claims priority to Swedish Application No. 0701480-6 filed Jun. 15, 2007, which is incorporated by reference herein.

FIELD OF THE INVENTION

The present invention concerns dust sealing between a rock processing equipment, such as a vibrating screen, feeder, hopper, chute, crusher or the like, and a cover or other part.

BACKGROUND OF THE INVENTION

As used in this description the terms "upper", "lower" and similar expressions are in relation to the directions as shown in the drawings.

In rock processing systems, rocks and large stones are first fed to a crusher and then the crushed material is transported to a vibrating screen or the like. In the crushers, screens and in the transports in and out of the different machines, there is often a relatively extensive dust formation. There is a general ambition to encapsulate the dust in and between the different machines and transport devices. In order to have dust encapsulation, it is known to arrange some kind of cover on the rock processing equipment.

It is further known to place a sealing strip between the rock processing equipment and the cover. The sealing strip is normally made of a polymeric material, such as rubber. During use, the sealing strip may flex alternately outwards and inwards, depending on possible movements of the rock processing equipment. As the sealing strip is flexing in several directions, it is likely to rupture after a relatively short time, due to the flexing back and forward. For example a vibrating screen will normally move about 8-12 mm back and forward. However at start and especially at stop, the vibrating screen may move considerably more, due to natural oscillation.

For ease of description, the expression "vibrating screen" is mainly used in this description, but it should be construed broadly to also cover "feeder", "hopper", "chute", "crusher" etc.

SUMMARY

One object of the present invention is to have a dust sealing in the form of a module system, for easy handling. No welding is used and no metal parts. The weight is kept low by not using metals. A further object is to control flexing of the sealing strip. According to the invention, this is done in that the sealing strip, is arranged slanted in relation to the sides of the vibrating screen and stationary cover, respectively.

By the slanting of the sealing strip the flexing of the sealing strip will be limited to one direction, thus, it will not flex at random back and forth over a central position.

Further objects and advantages of the present invention will be obvious to a person skilled in the art when reading the detailed description below of at present preferred embodiments.

BRIEF DESCRIPTION OF THE DRAWINGS

The invention will be described further below by way of examples and with reference to the enclosed drawings. In the drawings, FIG. 2 is a perspective view of a sealing according to the present invention, FIG. 3 is a sectional view of the vibrating screen, the stationary cover and the sealing of FIG. 1 showing the parts in use.

DETAILED DESCRIPTION OF THE PREFERRED EMBODIMENTS

Figure 1:
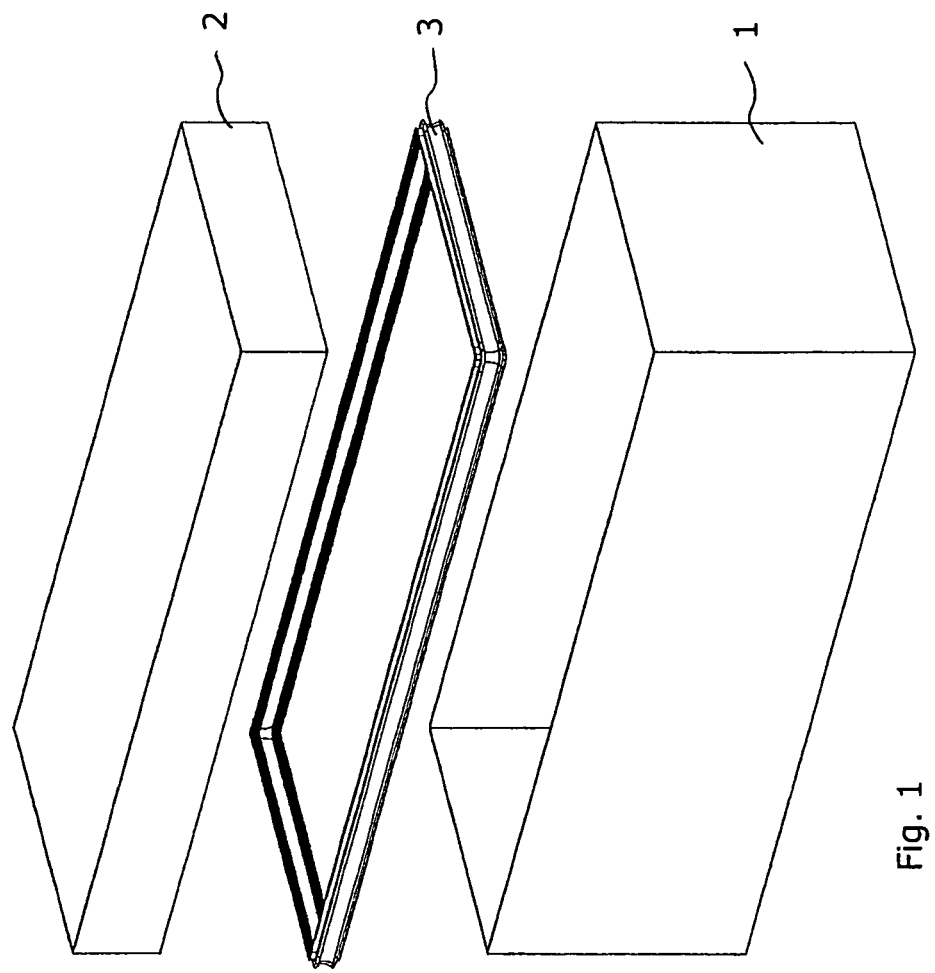
FIG. 1 is a perspective view showing a vibrating screen, a stationary cover and a sealing to be placed between the vibrating screen and the stationary cover.
Figure 4:
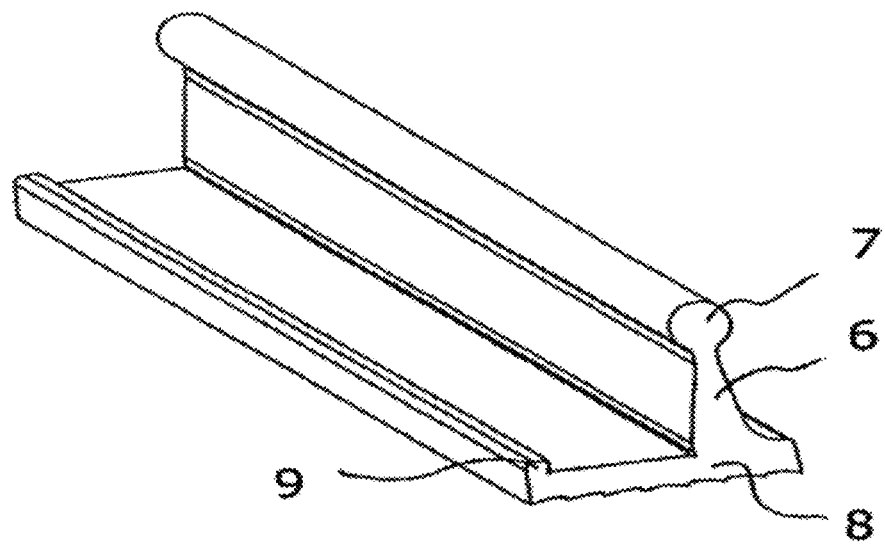
FIG. 4 is a perspective view of a part of a snap profile according to the present invention.
Figure 5:
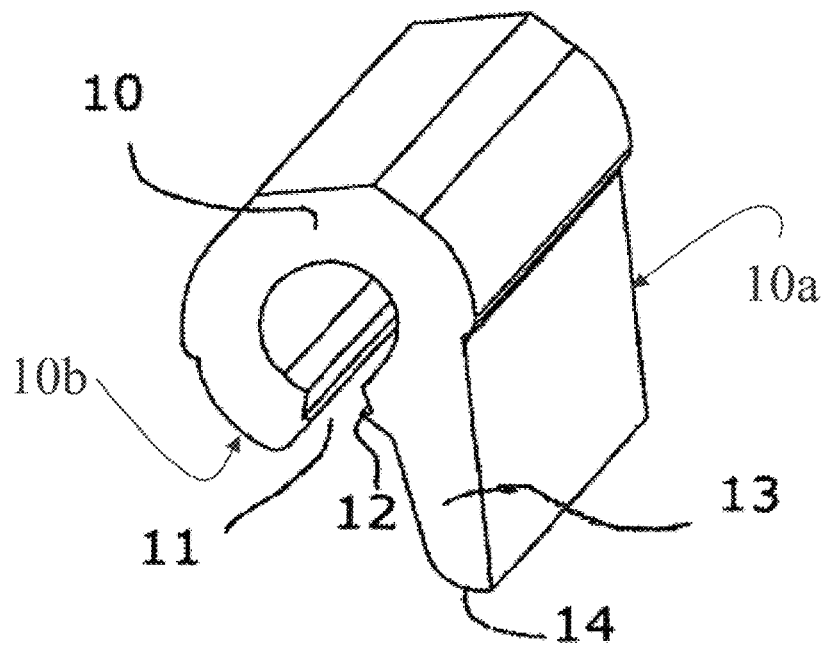
FIG. 5 is a perspective view of a part of a grip strip according to the present invention.

In FIG. 1, a vibrating screen 1, a stationary cover 2 and a sealing strip 3 are shown schematically. The sealing strip 3 is to be placed between the vibrating screen 1 and the stationary cover 2 to seal against dust leaving the vibrating screen 1. Normally, the stationary cover 2 has an opening through which the gravel etc. is fed to the vibrating screen 1 or feeder.

To attach the sealing strip 3 to the vibrating screen 1 and the stationary cover 2, respectively, snap profiles 4 are fixed on both the vibrating screen 1 and the stationary cover 2. The sealing strip 3 is then mounted to the snap profiles 4 by way of grip strips 5.

The snap profiles 4 are fixed close to the edges of the vibrating screen 1 and stationary cover 2, respectively. The snap profiles 4 have a base 8, a rib 6 extending at right angles from the base 8, and a bar 7 placed on top of the rib 6. The snap profiles 4 are placed all around the vibrating screen 1 and stationary cover 2, respectively.

The rib 6 of each snap profile 4 is placed towards one end of the base 8. In use, the snap profiles 4 are placed with the ribs 6 facing each other for snap profiles 4 placed across from each other on the vibrating screen 1 and stationary cover 2, respectively. The bar 7 at the top of each rib 6 has a generally round cross section. The snap profiles 4 are both straight parts and parts having different curvatures, adapted to the curvatures of the vibrating screen 1 and the stationary cover 2, respectively. Thus, snap profiles 4 of different shape are placed end to end along the edge of the vibrating screen 1 and the stationary cover 2, respectively.

The base 8 of each snap profile 4 is fixed close to an edge of the vibrating screen 1 or stationary cover 2 by way of a suitable adhesive. On the side facing the vibrating screen 1 or the stationary cover 2, the base 8 of the snap profile 4 has a wave form. The wave form is given by a number of valleys and ridges, extending in the longitudinal direction of the snap profile 4. By the wave form, the adherence to the different parts is enhanced.

In other embodiments, the snap profiles are fixed to the vibrating screen 1 or stationary cover 2 by way of bolts, tapes etc. At the upper side of the base 8, there is a raised portion 9 at the end remote from the rib 6. Thus, a recess is formed between the rib 6 and the raised portion 9 of each snap profile 4. The recess may be used as a guide for bands, washers etc. used for mechanical fixation of the snap profiles 4.

The grip strips 5 are to be snapped onto the snap profiles 4. The grip strips 5 extend all the way along the snap profiles 4. The grip strips 5 have an upper round part 10, in the form of an open C-shaped ring, having a gap 11. An extension 13 protrudes downwards from one side of the opening of the upper round part 10, so the grip strip includes long and short side portions 10a, 10b disposed on respective sides of the gap 11. The extension 13 is on the long side portion 10a, so the long side portion 10a is longer than the short side portion 10b. The lower end 14 of the extension 13 is rounded. Also the second side portion 10b of the grip strip 5 has a rounded lower end, in order to guide the sealing strip 3. The open space inside the round part 10 is to be placed on the round bar 7 of the snap profile 4. The rib 6 of the snap profile 4 is to be placed in the gap 11 of the round part 10. The grip strip 5 is made of an elastic material and the shapes of the round part 10 and its gap 11 are adapted to the bars 7 and ribs of the snap profiles 4 in such a way that the grip strips 5 can be snapped around the bars 7. At the gap 11 of the round part 10, edges 12 are placed on each side of the gap 11 and facing each other. The grip strips 5 will also give some shock absorption, due to the elastic material of the grip strips 5. In the same way as for the snap profiles 4, the grip strips 5 are alternating straight parts and parts having different curvatures. The grip strips 5 have identical cross section but are placed differently depending on where they are placed.

The sealing strip 3 is either made in one piece, as a band, or in several pieces glued together. By making the sealing strip 3 of several pieces, it is easier to adapt the sealing strip 3 to different curvatures. The sealing strip 3 is normally made of a polymeric material, such as rubber.

In use, the snap profiles 4 are first fixed to the sides of the vibrating screen 1, or other rock processing equipment, and the stationary cover 2, respectively. Then the sealing strip 3 is fixed to the snap profiles 4 by way of the grip strips 5. As shown in FIG. 3, on the snap profile 4 of the vibrating screen 1, the extensions 13 of the grip strips 5 are placed on the side directed towards the stationary cover 2. The grip strips 5 are placed on the snap profiles 4 of the stationary cover 2 with the extensions 13 on the side directed away from the vibrating screen 1. Thus, the short side portion 1% of the grip strips 5 of the stationary cover 2 face the long side 10a of the grip strips 5 of the vibrating screen 1, causing the sealing strip 3 to incline towards the vibrating screen 1. In other embodiments, the grip strips 5 are turned 180°, whereby the sealing strip 3 will incline towards the stationary cover 2. By controlling the lengths of the extensions 13 in direction towards the vibrating screen 1 or stationary cover 2, it is possible to control the inclination of the sealing strip 3. The sealing strip 3 is normally not held under tension between the vibrating screen 1 and stationary cover 2, but is kept slightly loose.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A dust sealing system of rock processing equipment, comprising:

a stationary cover;
a sealing strip placed inclined between the rock processing equipment and the stationary cover;
wherein the sealing strip is attached to first and second snap profiles fixed to the rock processing equipment and the stationary cover, respectively, by first and second grip strips placed on the first and second snap profiles, respectively, with the sealing strip squeezed between the snap profiles and the grip strips, wherein the grip strips have a generally C-shaped part with a gap, which generally C-shaped part is adapted to be snapped on bars of the snap profiles and wherein each grip strip has long and short side portions disposed on respective sides of the gap, wherein the long side portion is longer than the short side portion and arranged to press the sealing strip against the bar of the sealing strip on which the grip strip is snapped, and wherein the long side portion of one of the first and second grip strips faces the short side portion of the other of the first and second grip strips such that the sealing strip is inclined from the short side portion of one of the first and second grip strips to the long side portion of the other of the first and second grip strips.

2. The dust sealing system of claim 1, wherein the snap profiles are placed end to end along opposite edges of the rock processing equipment and the stationary cover, respectively.

3. The dust sealing system of claim 1, wherein each snap profile has a base, attached to the rock processing equipment or the stationary cover, a rib extending at right angles to the base, and a round bar at the top of the rib.

4. The dust sealing system of claim 3, wherein the rib of each snap profile is placed at one side of the base and wherein the sides having the ribs are facing each other for snap profiles placed across each other at the rock processing equipment and the stationary cover.

5. The dust sealing system of claim 2, wherein the grip strips extend along all of the snap profiles.

6. The dust sealing system of claim 1, wherein the snap profiles and grip strips are alternating straight parts and parts having different curvatures.

7. The dust sealing system of claim 1, wherein the snap profiles of the rock processing equipment have the same profile shape as the snap profiles of the cover.

8. The dust sealing system of claim 7, wherein the grip strips of the rock processing equipment have the same profile shape as the grip strips of the cover.

9. The dust sealing system of claim 1, wherein the grip strips of the rock processing equipment have the same profile shape as the grip strips of the cover.

10. The dust sealing system of claim 1, wherein the generally C-shaped part is round.

* * * * *